No. 737,744. PATENTED SEPT. 1, 1903.
L. A. KRAH.
VALVE FOR WATER HEATERS.
APPLICATION FILED APR. 12, 1901.
NO MODEL.

WITNESSES

INVENTOR
Ludwig A. Krah
by James K. Bakewell
his attorney

No. 737,744. Patented September 1, 1903.

UNITED STATES PATENT OFFICE.

LUDWIG A. KRAH, OF ALLEGHENY, PENNSYLVANIA.

VALVE FOR WATER-HEATERS.

SPECIFICATION forming part of Letters Patent No. 737,744, dated September 1, 1903.

Application filed April 12, 1901. Serial No. 55,442. (No model.)

*To all whom it may concern:*

Be it known that I, LUDWIG A. KRAH, of the city of Allegheny, county of Allegheny, and State of Pennsylvania, have invented a new and useful Improvement in Valves for Water-Heaters, of which the following is a full, clear, and exact description, reference being had to the accompanying drawings, forming part of this specification, and in which—

Figure 1:
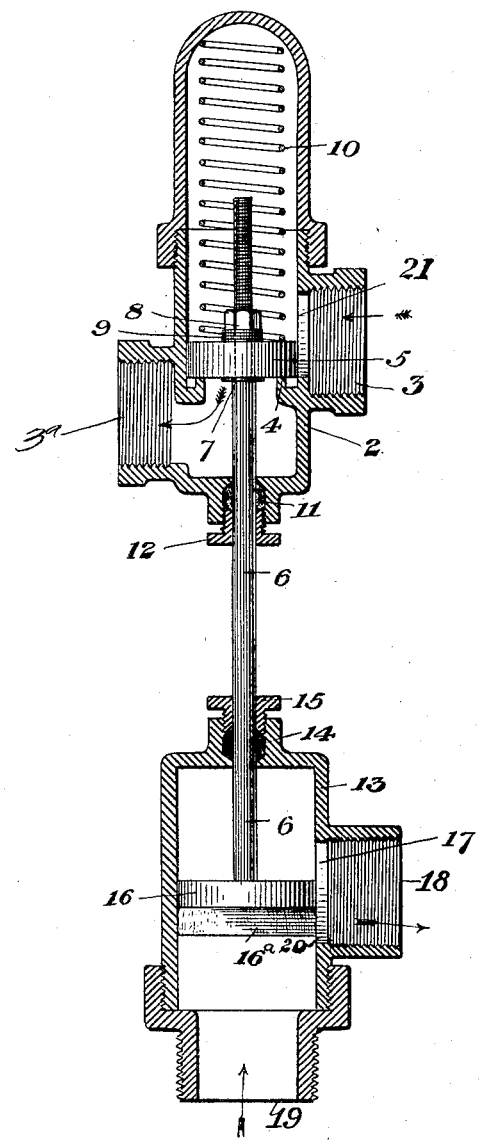
Figure 2:
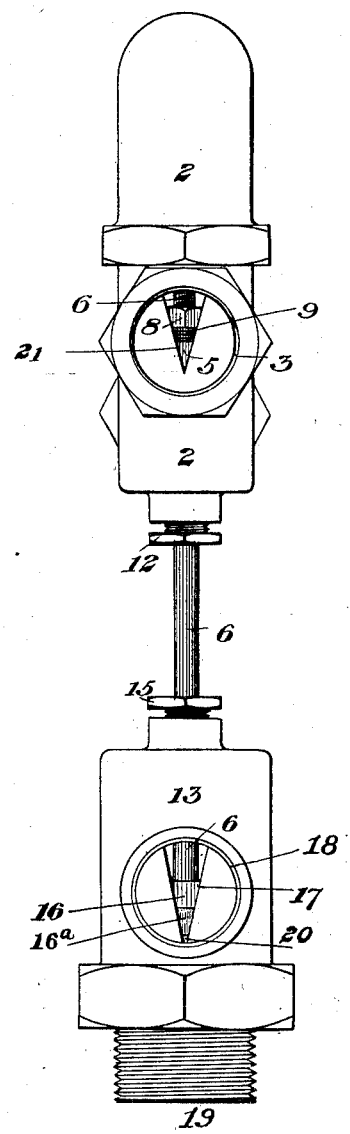

Figure 1 is a vertical sectional view of my improved valve, and Fig. 2 is a side elevation of the same.

Corresponding parts in both figures are designated by similar characters of reference.

My invention relates to improvements in gas and water valves for automatic water-heaters; and it has for its object to provide a device of this class which shall be simple in construction and certain and effective in the operation thereof.

With these ends in view the invention consists in the combination and arrangement of a gas-chamber and a water-chamber, both having cylindrical bores, with piston-valves disposed in said chambers and controlling, respectively, the outlet-port of the water-chamber and the inlet-port of the gas-chamber, said ports being so constructed and arranged relatively to the piston-valves that the pressure shall be sufficient to actuate said valves, while an increased pressure shall at an increased ratio increase the area of said ports, so as to render the operation of the device quickly effective.

The invention further consists in the improved construction, arrangement, and combination of parts, which shall be hereinafter fully described, and particularly pointed out in the claim.

In the drawings, 2 represents the gas chamber or casing of the gas-valve, having a threaded gas-inlet 3 and a gas-outlet 3ª. The chamber or casing has a cylindrical bore, in which is fitted a piston 5, forming a valve adapted to engage a seat 4, which is formed within the casing between the inlet 3 and the outlet 3ª. A valve or piston 5 is mounted upon a stem 6, which is provided with a collar 7, supporting said valve, and the latter is held in place by a nut 8, which fits on the threaded portion of the valve-stem. Between the nut 8 and the valve 5 are a number of thin washers 9. Extending between the upper portion of the valve 5 and the upper end of the valve-casing or gas-chamber 2 is a spiral spring 10, which serves to keep the gas-valve 5 normally in engagement with the seat 4. The stem 6 extends out of the casing 2 through the packing 11, held in place by the nut 12, and down into the water casing or chamber 13 through the packing 14 at the upper end of said chamber, which is held in place by a nut 15. At the lower end of the stem 6 is mounted a piston 16, constituting the water-valve, which may be formed of any suitable material, said piston being designed to open and close the water-port 17 in the water-outlet 18, the water-inlet 19 being arranged at the bottom of the casing 13 and being provided with a screw-thread by which suitable connection may be made with the water-supply. The water-outlet 18 is also provided with a screw-thread to connect it with a water-conduit passing to the heater.

The water-outlet port 17 and the gas-inlet port 21 consist of V-shaped openings formed in the walls of the respective chambers in alinement, respectively, with the water-outlet and the gas-inlet, as clearly seen in Fig. 2 of the drawings, the apices of said V-shaped slots being the lowest points of the ports. The purpose of this is to enlarge the size or effective area of the ports at a greater ratio with the movement of the valves than would be the case were the ports rectangular in form. It also serves to enlarge the size of the gas-port, according as the flow of water is increased. It will be noticed, as in Fig. 2, that when the gas-valve 5 is seated the water-valve 15 does not extend all the way to the apex of the V-shaped port, but leaves a small opening 20, which will permit a small leakage of water past the valve. This leakage is necessary to the successful operation of the device. By means of the washers 9 and the nut 8, whereby the gas-valve is secured on the stem 6, the size of the small opening 20 may be regulated by simply shifting the position of one or more of said washers from above to below the valve or piston 5, or vice versa, thereby lowering or raising the stem 6, supporting the valve or piston 16, and consequently adjusting the latter with relation to the V-shaped port or opening 21, as will be readily understood. The piston 16 may be provided with a packing ring or disk 16ª in order to render its operation more certain and effective.

The operation of my invention is as follows: When the water is turned on at the spigot and the pressure is decreased at the outlet 18 of the water-chamber 13, the pressure of the water under the piston or valve 16 overcomes the force of the spring 10 and raises the valve 16, permitting the water to flow through the water-port 17. At the same time the gas-valve 5 is raised and gas is allowed to pass through the gas-chamber 2 and port 4 to the burner of the water-heater.

Some of the advantages of my improvement are that the oridinary regulators which are used to regulate the sizes of the gas and water openings are dispensed with, inasmuch as owing to the V-shaped gas and water ports and the adjusting-washers 9 the sizes of the gas and water ports may always be kept at the desired proportion. At the same time friction of the parts is materially decreased, and the spring usually employed in the water-chamber to control the flow of water is dispensed with. This is a great advantage, as springs are apt to corrode in the water in a very short time. The only spring required in connection with my improved valve is that in the gas-chamber. It will also be seen that the valves of my improved device are simple pistons which by moving longitudinally in their respective cylindrical chambers control the passage of fluid through the ports in the side walls of said cylinders, thus presenting a construction which is simple, efficient, and not liable to get out of order. Thus, for instance, as soon as the piston in the water-chamber is raised by the pressure of water against its under side, caused by the opening to any extent of the spigot that controls the passage of water through the pipe, the piston in the gas-chamber will be simultaneously operated to precisely the same extent. There can be no irregularity of action, and no waste is liable to occur at any time.

Having thus described my invention, I claim—

In a device of the class described, two cylindrical casings disposed in longitudinal alinement and distinguished, respectively, as the upper and the lower casing, said upper casing being provided with an inlet and an exit opening disposed on opposite sides and the former above the latter, an annular flange forming a seat between said inlet and exit openings, a spring-pressed cylindrical valve engaging said seat and the inlet in the side of the casing and prevented by said seat from moving in a downward direction and said lower casing being provided with a water-inlet in the bottom thereof and a water-exit in the side thereof, a cylindrical piston in said lower chamber engaging the walls of the latter and constituting a valve to close the water-outlet, except at its extreme lower end, said piston being subject to the pressure of water entering through the bottom of the lower casing, packing-boxes in the adjacent ends of the respective casings, and a stem extending through said packing-boxes and connecting the valves in the respective casings.

In testimony whereof I have hereunto set my hand.

LUDWIG A. KRAH.

Witnesses:
A. M. STEEN,
JAMES V. BAKEWELL.